United States Patent [19]

Englehart

[11] 4,222,876
[45] Sep. 16, 1980

[54] UNDERDRAIN FILTER SYSTEM

[76] Inventor: John D. Englehart, 8707 Old Colony Trail, Apt. 3, Knoxville, Tenn. 37919

[21] Appl. No.: 957,489

[22] Filed: Nov. 3, 1978

[51] Int. Cl.² .................................................. B01D 23/18
[52] U.S. Cl. ........................................................ 210/293
[58] Field of Search ................... 210/293; 52/295, 365, 52/122, 126

[56] References Cited

U.S. PATENT DOCUMENTS

| 1,277,832 | 9/1918 | Beckley | 210/293 |
|---|---|---|---|
| 1,503,148 | 7/1924 | Bernstram | 52/365 |
| 2,263,964 | 11/1941 | Camp | 210/293 |
| 2,625,815 | 1/1953 | Black | 52/295 X |
| 3,144,375 | 8/1964 | Day | 52/295 X |
| 3,178,026 | 4/1965 | Christy | 210/293 |
| 3,615,019 | 10/1971 | Early, Jr. | 210/293 |
| 3,630,474 | 12/1971 | Minor | 52/295 |
| 3,762,559 | 10/1973 | Knoy et al. | 210/293 |

Primary Examiner—Theodore A. Granger
Attorney, Agent, or Firm—Pitts & Kesterson

[57] ABSTRACT

An apparatus for constructing an inexpensive and easily fabricated underdrain filter system is disclosed. The underdrain filter system of this invention includes a liquid impervious container having a horizontal support base and continuous sides. Adjustable support anchors are rigidly attached to the horizontal support base and in turn support a multiplicity of perforated plates. Perforated plates are located and securely attached to the anchor bolts such that the plates will form a plane which is parallel to said horizontal support base and which extends between the continuous sides. The support anchors are made of a material such as stainless steel which is impervious and substantially inert with respect to the liquid being filtered. In addition, the perforated plates are also inert with respect to the liquid being filtered, and may, for example, be made of a material such as polyvinyl chloride (PVC), stainless steel, copper, fiberglass, etc. As is the case with respect to presently available filtration systems, a filtration medium such as gradated gravel and sand is located above and supported by the perforated plates.

5 Claims, 7 Drawing Figures

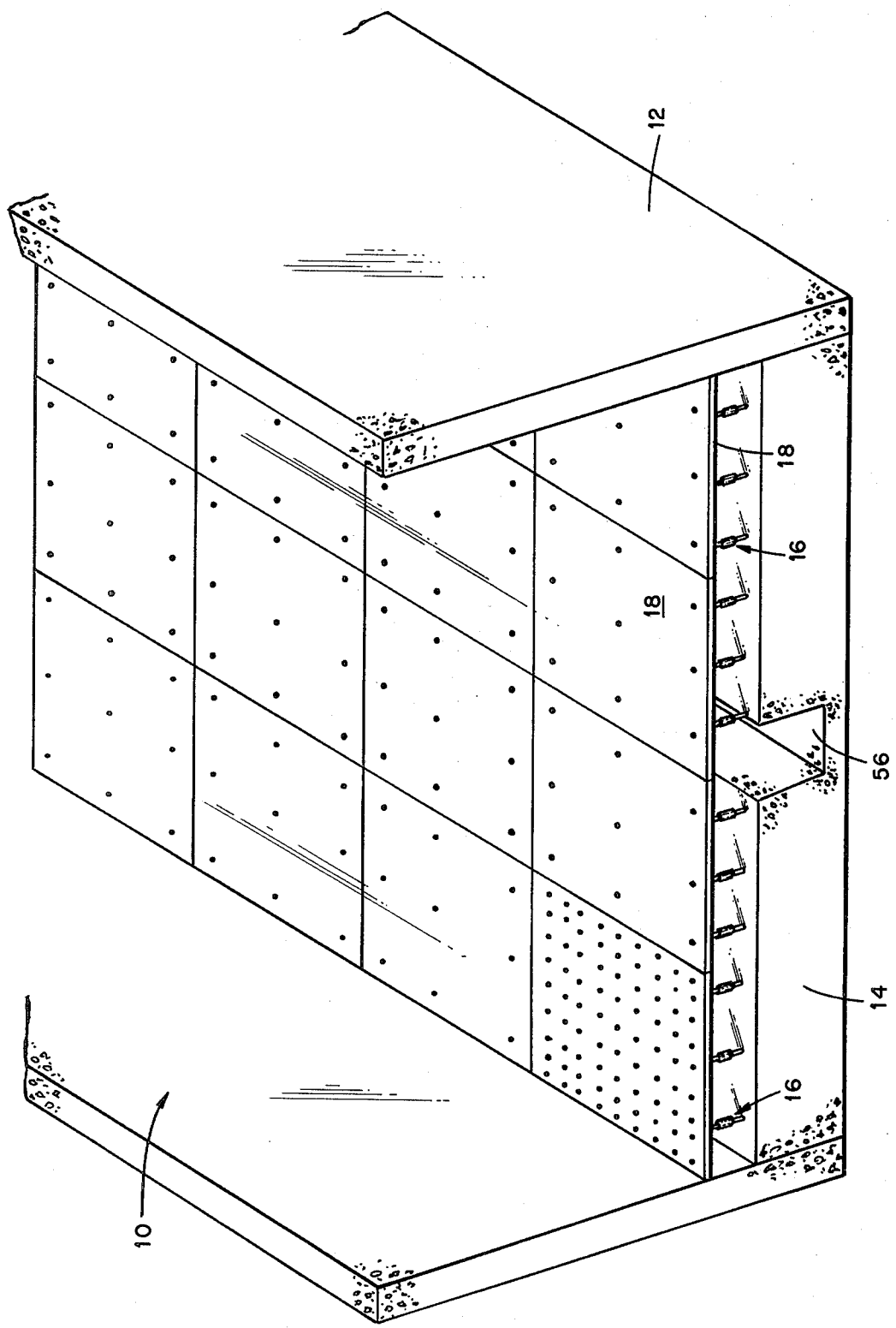

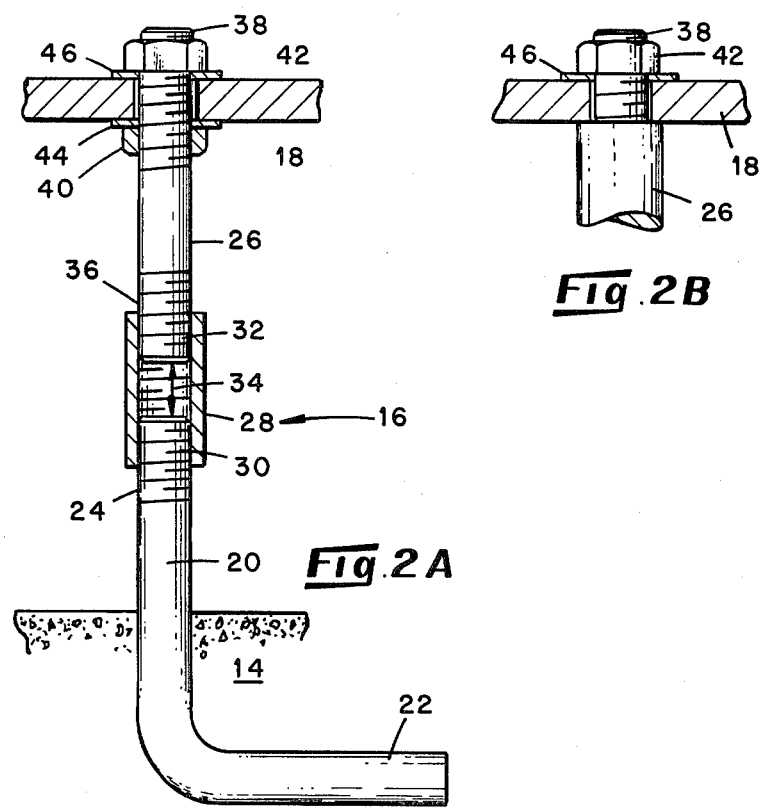
Fig. 2A
Fig. 2B
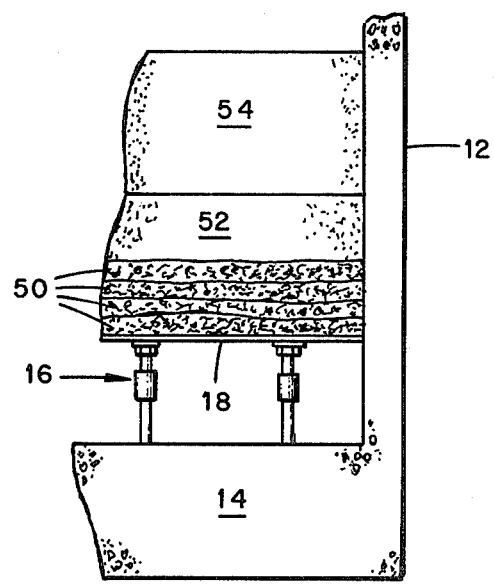
Fig. 4

UNDERDRAIN FILTER SYSTEM

BACKGROUND OF THE INVENTION

This invention relates to underdrain filter systems which use sand and gravel as a filtering medium, and more particularly to such a system for use in sewage treatment plants in which the filtration medium is supported above the space provided for the collection of filtered liquid.

Typical underdrain filter systems provide for a downward flow of the liquid through the filtration medium, then through a collection pipe by which it is directed to a selected location. For example, in such an early system described in U.S. Pat. No. 730,518 which issued on June 9, 1903 to F. A. W. Davis, there is shown such a filtering apparatus which includes numerous rectangularly shaped conduits or tiles which have perforations on the top side. These conduits are laid end to end and side by side such that they create a plurality of channels which direct the water or liquid to a collection reservoir. The tops of the conduits or tiles are perforated so that water draining from the filtration medium may enter into the conduits. It will be appreciated, however, that the filtering system described in this patent is unusually susceptible to breakage of the many and numerous tiles. In the event of such breakage, there will not be an even flow of water throughout the entire area of the filter bed. In addition, the tiles are extremely heavy and difficult to put in place by a small crew of workmen. Furthermore, the expense of such complex tiles and the insulation costs make such a system very unattactive when considering cost.

Another U.S. Pat. No. 2,378,239 issued to John P. Myron on June 12, 1945 also uses numerous complex tiles which must be fitted carefully together during installation. Each of these tiles include several chambers some of which are dead end, and others which run the complete length of the tile. The top side of each tile has numerous perforations such that the filtered liquid may flow into the dead ended chambers. Each of the dead ended chambers in turn has holes connecting it to the larger chambers which run the length of the tiles. Thus, although the technique disclosed in the Myron Patent, discloses closely interlocked tiles which are securely attached to the support bed of the filtration system, in a way suitable for allowing backwash during the cleaning of this system and which do provide for an even flow of water through the whole area of the filtered bed, the complex tiles used herein are even more expensive than that discussed in the Davis Patent and require additional effort and skill in the installation thereof.

Still another U.S. Pat. No. 1,770,830 issued to J. G. Barbour, July 15, 1930 illustrates a prior art technique. This patent is somewhat similar to the techniques described heretofore with respect to the Davis and Myron Patents, except that according to this patent there is a first course of channel tiles which are laid on the bed of the filtration system. These channel tiles are then topped with a course of perforated or drain tiles. Thus, the complexity and installation costs are even further increased from the techniques discussed heretofore in that two layers of tiles must be set in place.

Still another U.S. Pat. No. 10,370 issued to M. Stewart on Jan. 3, 1854, illustrating a malt dryer appears to use some of the construction techniques of a filtration system. According to this patent a malt dryer for providing hot air from a furnace includes several horizontal perforated metal sheets. The hot air is forced up through the perforations to dry the malt. The perforated sheets are held in place by the use of supports around the edges of the container and by individual support members at each corner of the perforated sheets. However, it will be appreciated that the purpose of this apparatus is completely different from that of filtration, and other than showing perforated sheets and support blocks is in no way related to the art of filtration or to the present invention.

Other patents describe various types of filtration systems which have some similarities of a sewage filtration system and should be considered in evaluating the technique of the present invention. However, none of these patents show the unusual combination of elements comprising the present invention for fabricating a very inexpensive and simply constructed effective filtration system. For example, U.S. Pat. No. 1,277,832 issued to W. R. Beckley on Sept. 3, 1918 illustrates a filter for corrosive chemicals which uses filtering plates supported at their corners by a corrosive resistance support members. According to this patent, each of the plates constitutes a portion of the filter.

U.S. Pat. Nos. 80,110 issued to T. G. Arnold; 298,172 issued to G. G. Cave; 450,209 issued to W. W. Whiddit; 513,215 issued to H. Strater; 1,686,017 issued to M. B. Lovett; 2,139,924 issued to H. L. Woodruff; 2,127,270 issued to J. Schaff and 4,018,147 issued to O. O. Hensel show various combinations of arrangements of perforated plates used for draining liquids of various types. In addition, U.S. Pat. No. 2,032,668 issued to R. C. Schock on Mar. 3, 1936 includes, in addition to an arrangement of perforated plates, a specific technique for leveling and adjusting the height of these plates. However, as is seen from a review of all of the art discussed above all presently available filtration techniques use either complex tiles or complex perforated plates which are expensive to manufacture and even more expensive to install into the proper locations.

Therefore, to overcome the shortcomings of presently available methods and apparatus, it is an object of this invention to provide methods and apparatus for constructing an inexpensive and simple filtration system.

It is still another object of this invention to provide an effective filtration system that can be readily backwashed.

It is a further object of this invention to provide a filtration system easily transported, and readily installed by a small crew.

To accomplish the above mentioned objects as well as other objects which will become evident from the following drawings and detailed description, the present invention includes an underdrain filtration system comprising a container having a horizontal support base and continuous sides extending above said support base to a selected height. The container support base includes a pipe, trench or other means for carrying the liquid in a selected direction, and toward an aperture located in the side of the container. The container is made of a material such as concrete, tile, stainless steel or the like which is impervious and inert with respect to the liquid being filtered. A multiplicity of adjustable support anchors are rigidly attached to the horizontal support base and extend to the interior of the container. In the case of a concrete container, these support members may, for example, be located in position when the concrete is poured, or may be attached in any other suitable but permanent manner. The support members are also made of a material which is both impervious and inert with respect to the liquid being filtered. A plurality of perforated plates are rigidly attached to the support members such that they form a continuous plane which is parallel to the horizontal support base and at a selected distance therefrom. The perforated plates may have any selected shape and size which is readily handled by a single workman. In addition, the perforated plates are also made of a material which is both inert and impervious to the liquid being filtered. As examples, the plates may be made of fiberglass, PVC, stainless steel, etc. Once the plates are securely in place, a filtration medium such as stones and sand of selected and varying sized are used to fill the space above the perforated plates up to a level necessary to achieve the desired filtration. Thus, it can be seen the liquid to be filtered percolates down through the filtration medium to the perforated plates. The liquid then flows through the perforations of the plates into the space created by the perforated plates and the horizontal support base. From this space, the liquid is routed by the trench in the support base to the aperture in the container sides.

Accordingly, the above mentioned objects and subsequent description will be more readily understood by reference to the following drawings wherein:

FIG. 1 is a perspective view showing the filtration system of this invention without the filtration medium.

FIG. 2A, shows a cross-section of the adjustable anchor used to support the perforated plates used by the system of this invention.

FIG. 2B shows a portion of an alternate anchor arrangement.

FIGS. 3 and 4 show an enlarged section of FIG. 1 of the arrangement of the support anchors in the support base and the perforated plate supporting the filtration medium.

Figure 3:
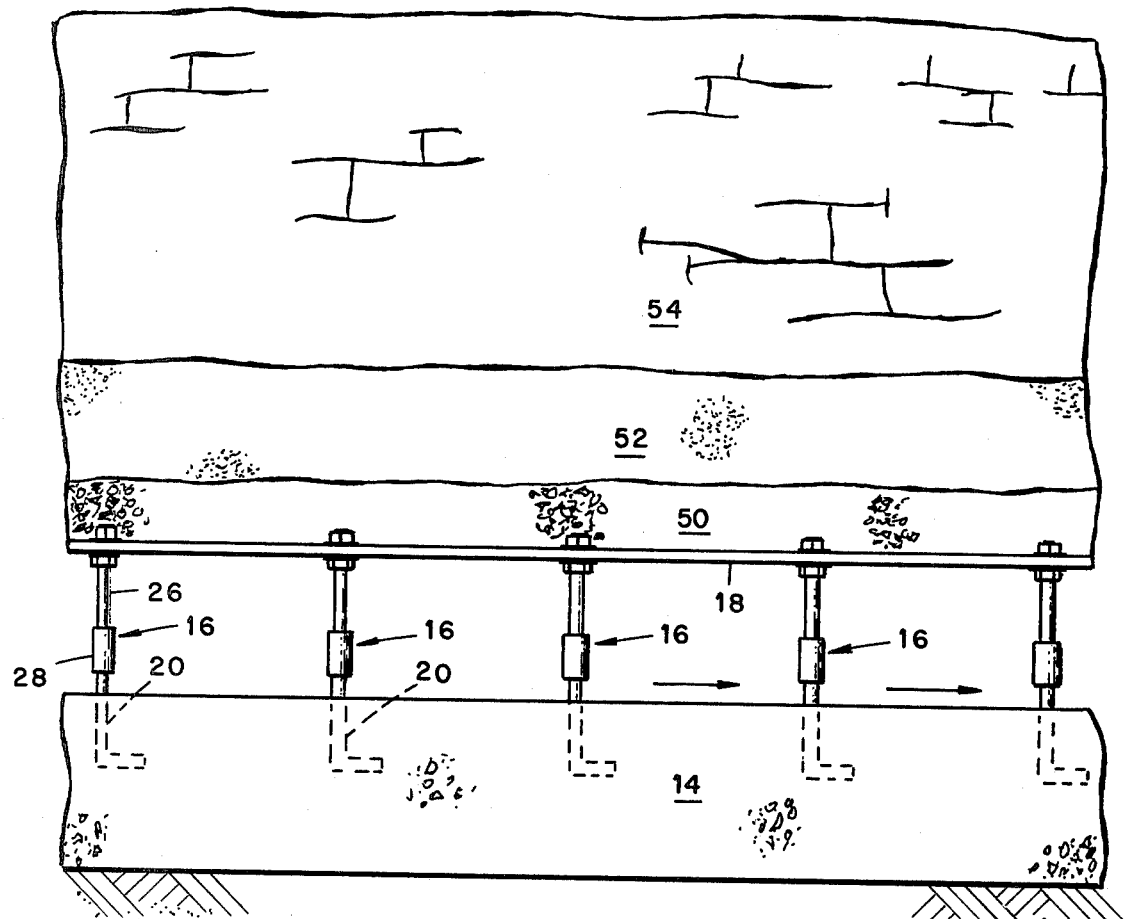

Referring now to FIGS. 1, 3 and 4, there is shown a section of an impervious container 10, having side walls 12 and support base 14. As is seen, container 10 is substantially a closed unit except that it has no top. Container 10 is preferably made of cast concrete having a finished smooth inside surface to provide minimum opportunity for the collection of debris, and may be buried within the earth such that support is provided to both the support base 14 and walls 12. Typically, the concrete would have a thickness between eight to sixteen inches depending on the particular design. Rigidly attached to support base 14 are adjustable anchors 16 which are illustrated as extending perpendicular to the horizontal plane of the base and into the interior of container 10. Anchors 16 are typically placed into the proper position prior to the concrete from which the base and walls are constructed being poured. In some situations, it may be desirable to weld the anchor bolts to the reinforcement rod before the concrete is poured. It has also been found, the use of a template for positioning anchors 16 prior to pouring of the concrete results in properly aligned anchors.

A plurality of perforated sheets 18 are supported by adjustable anchors 16 such that they are parallel to the horizontal base support 14. In addition, perforated sheets 18 are arranged such that the edges of each sheet are in contact with the edges of its neighboring sheet. Thus, it can be seen that the plurality of perforated sheets 18 form a continuous plane which plane is parallel to base support 14 and at a spaced distance from base support 14. As will be discussed hereinafter, perforated sheets 18 may be of any desired size or shape, and have any number of holes with a selected diameter. However, plates having a two foot by two foot configuration with 81 9/16 inch holes has been found effective. The perforated plates are made of a material which is substantially inert with respect to the liquid being filtered. Such a material could be selected from a group including, but not limited to, stainless steel, fiberglass, copper polyvinyl chloride (PVC), etc. The thickness of the plates would of course vary depending on its material, but should be able to support filtration medium loading of about 3.64 pounds per square inch.

Referring now to FIG. 2A, there is shown a cross-sectional view of an anchor bolt 16 with plate 18 in position. A suitable type bolt is a ½ inch 302 or 316 stainless steel bolt. As is seen in this Figure, anchor 16 is comprised of a first portion 20 having an end 22 which is embedded in the concrete of base support 14, and which in this particular embodiment, is shown as being bent. It will be appreciated, of course, that any type of protrusion at embedded end 22 would serve to secure anchor 16 in the concrete. The whole portion 20 could, for example, simply be a machine or carriage bolt embedded in the concrete. Extending perpendicular to the horizontal plane of base 14 is a threaded part 24 of portion 20. A second portion 26 of anchor 16 is held in place by threaded sleeve 28. Sleeve 28 includes a first half 30 having threads suitable for mating with threads 24 of portion 20. A second half 32 of threaded sleeve 28 includes threads cut in the opposite direction and which mate with end 36 of the second portion 26 of the anchor 16. Thus, it can be seen that by turning sleeve 28, the distance between portions 20 and 26 of anchor 16 as represented by arrow 34 may be varied as desired. Portion 26 includes a second threaded portion 38 suitable for receiving matching nuts 40 and 42. Perforated plates 18 are securely mounted to the anchors at end 38. This is accomplished by first installing nut 40 into position followed by a washer 44 which in turn is followed by one of the perforated plates 18. Plate 18 is in turn secured to bolt 16 by washer 46 and nut 42. It will be appreciated, however, by those skilled in the art that rather than using the nut 40 and washer 44 combination to support plate 18 it would be equally suitable to use a stud 26 having a shoulder for perforated plate 18 to rest on. As is shown in FIG. 2B, washer 46 and nut 42 are then used to secure perforated plate 18 into position.

Thus, it can be seen that once the plurality of plates 18 are secured in position by anchor 16, a continuous plane of perforated plates is provided which is parallel to the horizontal plane of base support 14, and which extends to and is in contact with the walls 14. Minor adjustments may be made to the position of perforated sheets 18 by adjusting sleeves 28 of anchor bolts 16 as was discussed heretofore. Once the plurality of perforated plates 18 are in position it may be desirable to include a filler or cement in between the edges of adjacent ones of the perforated plates 18. However, in most circumstances, the spacing between the adjacent plates should be so small that there is no requirement for the use of such a cement or filler.

The filtration medium is then distributed over perforated plates 18. In the embodiment shown in FIGS. 3 and 4, the filtration medium first includes a layer 50 of gravel having several gradations. For example, four gradations of gravel might be used which would include a first level which is located adjacent perforated plate 18 and which consists of gravel having a maximum diameter between ¾ and ½ inch. On top of this first layer would be a second layer of gravel having a maximum diameter of between ½ and ⅜ inch. This level would then be followed by a level having a maximum diameter of between ⅜ and 174 inch and lastly a final level would have a maximum diameter of between ¼ and ⅛ inch. On top of the four levels of gravel 50, there is included a layer of sand 52. The sand itself might also be in various gradations of grit size but in the embodiment shown consists simply of a 6 to 10 inch layer of coarse sand. The layer of coarse sand 52 is then typically followed by a 30 inch layer of anthracite coal 54.

Thus, there has been described the features of this new and novel filtration system. In operation, raw water or sewage or another chemical to be filtered is introduced over the layer of antracite coal 54. The water percolates down through the coal to sand 52 and then through the various gradations of gravel layers 50. By the time the water has percolated through gravel 50, it has been substantially filtered and is ready for discharge, for further sterilization or for introducing back into a water source. Thus, the water will drain or flow through the perforations of plate 18 into the space or plenum chamber defined by the plate 18, the base support 14 of the container and the walls 12 of the container. Thus, the water collects in this space on the surface of base support 14, and as its head pressure builds up it will flow into trench 56 which is formed in base support 14. Trench 56 then routes the water to an aperture in one portion of wall 12 (not shown) for further distribution and use.

Figure 5:
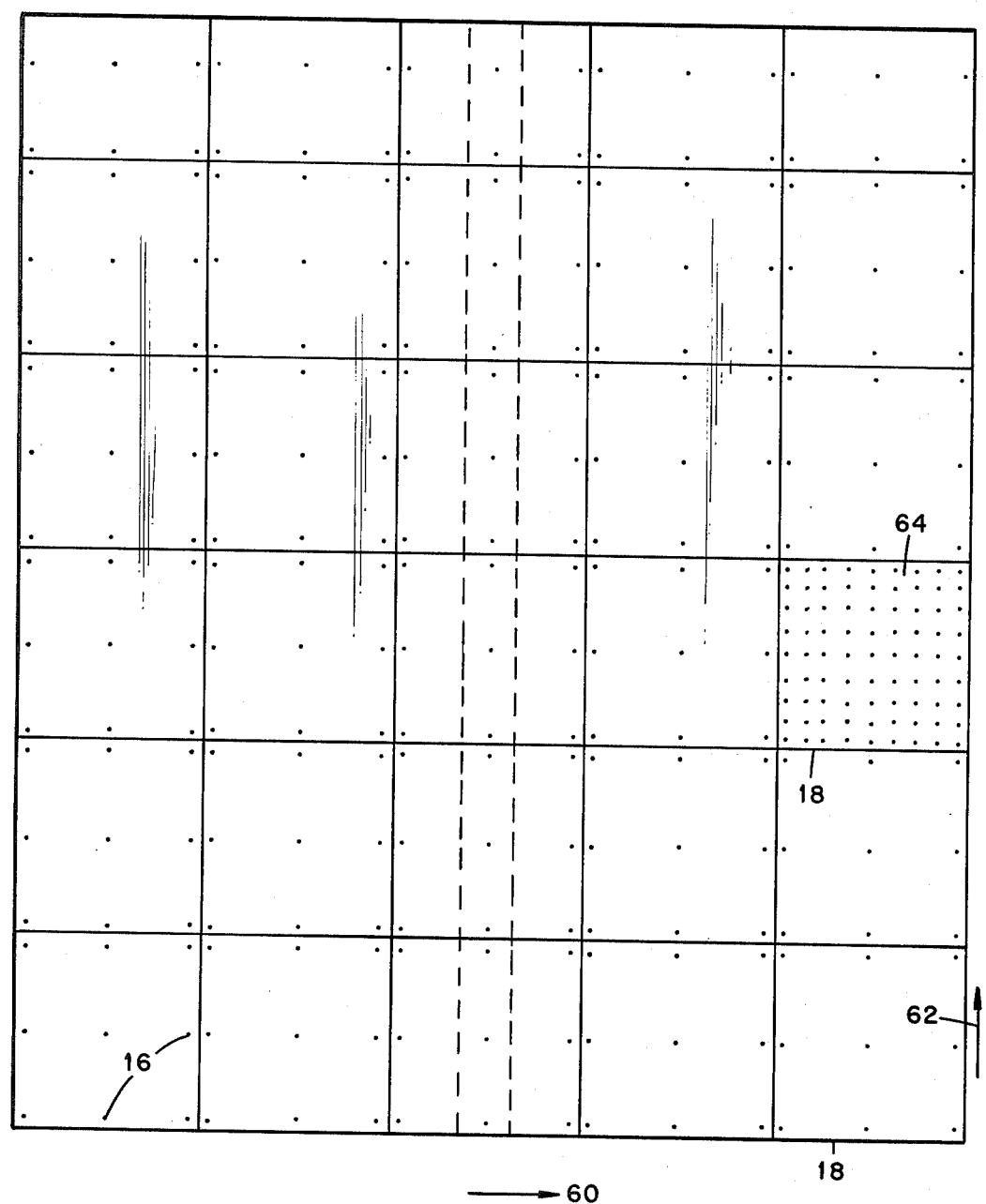
FIG. 5 represents a composite of a multiplicity of the perforated plates used in fabricating the system of FIGS. 1 and 2.
Figure 6:
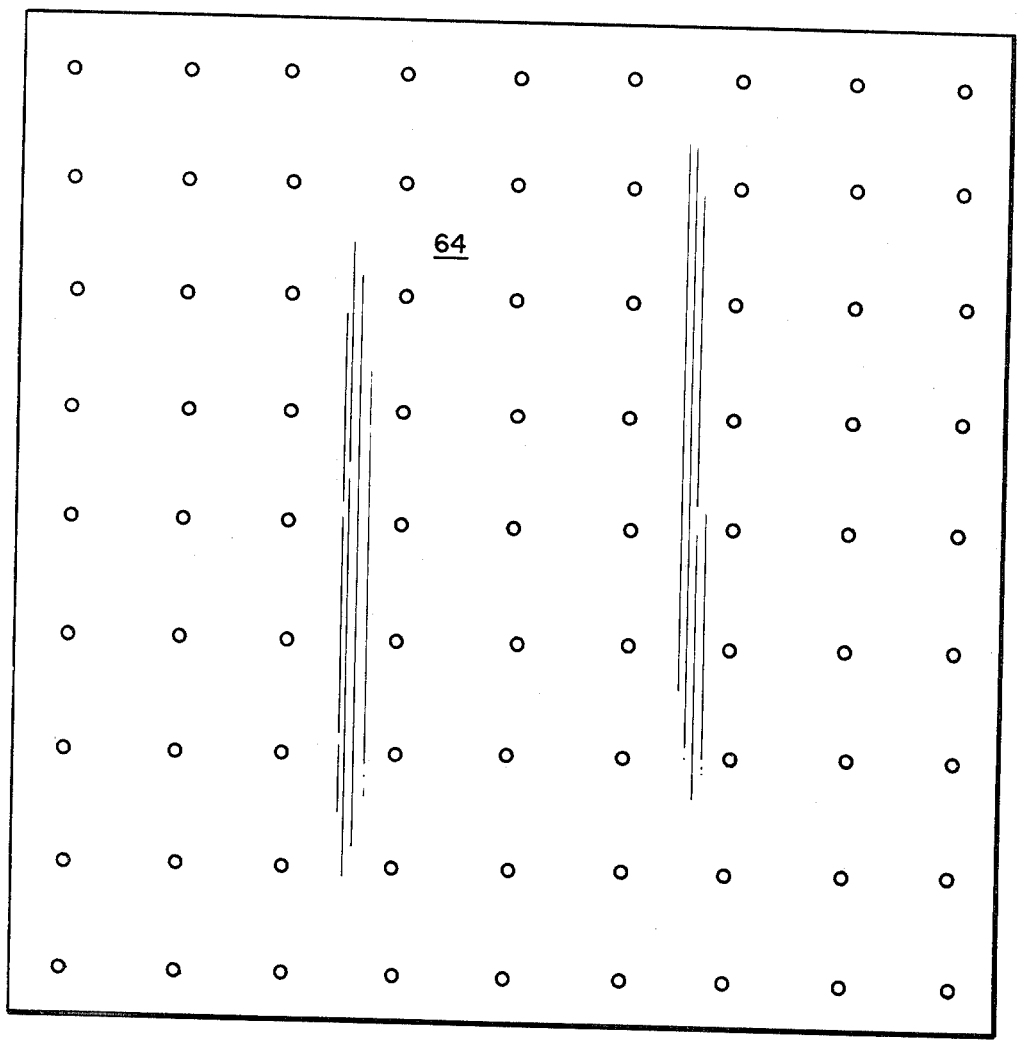
FIG. 6 is a top view of a single perforated plate used in this invention showing a typical arrangement of the perforations.

Referring now to FIGS. 1 and 5, the modularity of this invention is illustrated. In FIG. 5, for example, there is shown a configuration of ½ inch PVC plates. There are five plates in one dimension 60 and six plates in the second dimension 62. Although not shown, wall 14 runs along the perimeter of this arrangement of perforated plates 18. It will be appreciated, of course, that this particular configuration of five plates by six plates is in no means necessary, and that the number of plates in any one direction could be of any selected number. It will also be appreciated that the individual plates may be of any selected size and for that matter could be of various shapes. That is, instead of the square configuration shown in FIGS. 1 and 5, plates could be rectangular or of any other shape such as hexagon or octagon, etc., which can be fitted together without leaving any gaps. It is anticipated, however, that such exotic shapes would be more expensive to manufacture and the surrounding walls would also be more expensive to install. The particular configuration of FIG. 5, however, is believed to be highly efficient and flexible for most applications, and will be discussed. However, as was stated above the described configuration represents only one embodiment and other embodiments of such a modular system having various dimensions and shapes is intended to be covered by the scope of this application. This particular embodiment was designed to use a total of 30 perforated plates which are substantially four foot square. Thus, as is shown, there are five plates along dimension 60 (approximately 20 feet) and six plates along dimension 62 (approximately 24 feet). As is also shown, each perforated plate is supported by nine anchor bolts 16. These nine bolts are arranged such that there are three anchor bolts along each edge of each plate, and one anchor bolt in the center thereof. Thus, these anchor bolts are shown as being on 22 inch centers. Assuming a filter material having an average weight of 150 lbs. per cubic foot (which is believed to be realistic) the loading for a typical filter system would be on the order of 3.64 lbs. per square inch. Referring to plate 64 of FIG. 5 and shown enlarged in FIG. 6, there is shown the perforations of a typical plate. It will be appreciated that although only plate 64 of FIG. 5 shows all the perforations, the remaining plates in FIG. 5 also contain such perforations. In the embodiment as shown in FIG. 6, plate 64 contains 81 holes which typically might have a diameter of 9/16 inch. It will also be noted that the holes are shown as being arranged in an orderly fashion. However, it will be appreciated by those skilled in the art that the arrangement of the holes could be varied as desired for particular types of filtration jobs. In addition, either the diameter of the holes could be varied or the number of the holes could be changed.

The filtration system of this invention may also be readily backwashed when dirty since the perforated plates are rigidly attached to the anchor bolts which are in turn rigidly attached to base support 14.

From the above paragraphs, it should be understood that the flexibility offered by this modular system is of significant importance. For example, the distance of the plane of the perforated plates from the base support 14 may be readily varied by changing the length of the stud portion 26 of anchor bolts 16, and minor adjustments to level the plane of the perforated plates may be easily accomplished by simply adjusting sleeves 30 connecting the two portions of anchor bolt 16. Thus, unlike previous filtration systems which were literally "cast in concrete" great flexibility is available to the user in adjusting the size of this space. Likewise, by using a plurality of small perforated sheets, great variations in size and shape can be achieved simply by increasing or decreasing the number of plates to be used. Thus, the designer is free to vary the size and shape of the filtration system to meet a particular job requirement without experiencing a great increase in cost because the system varies from some preset standard size or shape. Finally, because of the light weight of installing the anchor bolts 16 and the light and easily handled perforated sheets 18, this invention provides great flexibility in the installation of a particular filtration system. For example, for a typical system a single truck could deliver all of the perforated sheets and anchor bolts which may then easily be installed by a two-man crew. Once the container 10 is in position there are no heavy objects or tiles to be placed in position which require either auxiliary handling equipment or at least two men.

Although the present invention has been described with specific methods and apparatus for providing an underdrain filtration system which is both inexpensive and easy to install, it is not intended that such specific references be considered limitations upon the scope of the invention except insofar as is set forth in the following claims.

What is claimed is:

1. A modular underdrain filtration system for filtering a selected liquid comprising:
   a container having a horizontal support base and continuous sides extending above said support base to a selected height, said container being made of a material impervious and inert with respect to the liquid being filtered, said support base including means for routing the liquid in a selected direction and said container sides defining an aperture for allowing the escape of the said filtered liquid;

a multiplicity of support members rigidly attached to said horizontal support base and extending to the interior of said container, said support members being made of a material substantially inert with respect to said liquid being filtered, said support members comprising adjustable anchor bolts which include a first portion rigidly attached to said support base at one end and threaded on the other end, a second portion threaded on its first end and having a second end suitable for securing plates thereto, a sleeve having a first set of threads cut at one end for mating with said threaded end of said first portion, and a second set of threads cut at the second end of said sleeve for mating with said threads on said first end of said second portion, said threads on said sleeve and said first and second portions being arranged such that the length of said anchor bolt can be adjusted by turning said sleeve on its longitudinal axis;

a plurality of non-porous plates, each of said plurality of non-porous plates defining a multiplicity of perforations and each said plate being rigidly attached to said support members at selected ones of said perforations, said non-porous perforated plates being made of material substantially inert with respect to said filtered liquid, and being oriented such that they form a continuous plane parallel to said horizontal support base and at a selected distance therefrom, and such that said continuous plane extends between said continuous sides; and a filtration medium located above and supported by said non-porous perforated plates such that the liquid to be filtered percolates down through said filtration medium to said perforated plates, said liquid then flowing through said multiplicity of perforations into the space defined by said perforated plates and said container support base and sides, said liquid then being routed by said routing means through said aperture and out of said container.

2. A modular underdrain filtration system for filtering a selected liquid comprising:

a plenum chamber having as its top side a plurality of multiple perforated plates held in position by a plurality of support members, said perforated plates being made of non-porous material substantially inert with respect to said liquid being filtered and being oriented such that they form a horizontal plane having a perimeter of a selected size and shape, said plenum chamber being further enclosed on all remaining sides by a container having a support base parallel to said horizontal continuous plane of non-porous perforated plates said support base including a routing means for routing liquid collected thereon in a selected direction, and sides which are in contact with said perimeter of said plane of perforated plates, and which sides define an aperture;

a multiplicity of support members rigidly attached to aid support base at selected ones of said perforations in said plurality of plates for maintaining the perforated plates at a selected distance from said support base, said support members comprising adjustable anchor bolts which include a first portion rigidly attached to said support base at one end, and threaded on the other end, a second portion threaded on its first end and having a second end suitable for securing said perforated plates thereto, and a sleeve having a first set of threads cut at one end for mating with said threaded end of said first portion, and a second set of threads cut at the second end of said sleeve for mating with said threads on said first end of said second portion, said threads on said sleeve and said first and second portions being arranged such that the length of said anchor bolt can be adjusted by turning said sleeve on its longitudinal axis; and a filtration medium located above and supported by said perforated plates such that liquid to be filtered percolates down through said filtration medium to said perforated plates, said liquid then flowing through said perforations into said plenum chamber, said liquid then be routed by said routing means to said aperture and out of said container.

3. The system of claims 1 or 2 wherein said perforated plates are made of material selected from the group consisting of polyvinyl chloride (PVC), fiberglass, stainless steel and copper.

4. The system of claims 1 or 2 wherein said filtration medium comprises:

a plurality of layers of gravel, each layer of gravel being of a selected size; a layer of sand; and a layer of anthricite coal.

5. The system of claims 1 or 2 wherein said perforated plates are made of a non-porous material selected from the group consisting of polyvinyl chloride (PVC), fiberglass, stainless steel and copper; and wherein said filtration medium comprises a plurality of layers of gravel, each layer of gravel being of a selected size; a layer of sand; and a layer of anthricite coal.

* * * * *